(No Model.)
J. FEAST, Sr.
CULTIVATOR.
No. 311,303. Patented Jan. 27, 1885.
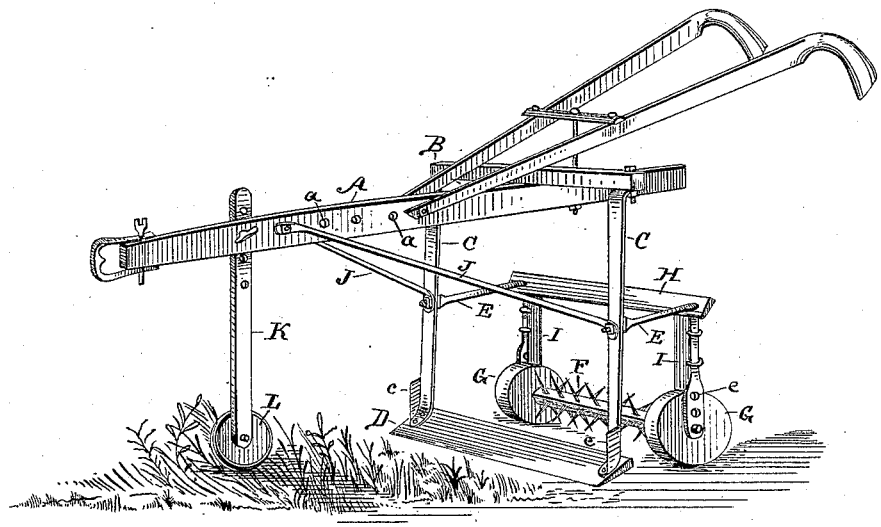
WITNESSES:
Thos Houghton.
A. G. Lyne.
INVENTOR:
John Feast Sr
BY Munn & Co
ATTORNEYS.

UNITED STATES PATENT OFFICE.

JOHN FEAST, SR., OF BALTIMORE, MARYLAND.

CULTIVATOR.

SPECIFICATION forming part of Letters Patent No. 311,303, dated January 27, 1885.

Application filed July 21, 1884. (No model.)

*To all whom it may concern:*

Be it known that I, JOHN FEAST, Sr., of Baltimore, in the State of Maryland, have invented a new and useful Improvement in Cultivators, of which the following is a full, clear, and exact description, reference being had to the annexed drawing, forming part of this specification.

My invention relates to that class of cultivators known as "scufflers," in which a blade or hoe is pushed along the surface of the ground to root up weeds; and the invention consists in a wheeled scuffler combined with a rotary rake and adapted to be drawn instead of pushed, as hereinafter more fully described.

The drawing is a perspective view of my improved cultivator or scuffler. The beam A is provided with a cross-piece, B, near its rear end, to the ends of which cross-piece are bolted the bars C C, to the lower ends of which is secured the blade D. The bars C C, which are made of metal, are each constructed with their ends bent in opposite directions, and perforated to receive the bolts by which they are connected to the cross-bar B and to the blade D.

At the rear of the bars C C are arranged two angular bars or rods, E E, which are threaded at one end and passed through perforations in the bars C C, in which position they are secured by nuts. The opposite ends of the bars E E, which are thus held near the ground, are provided with a series of perforations, *e*, by which the axle of the rotary rake F and wheels G G may be supported at any desired elevation above the ground. The bars E E are connected together at their angles by the cross-bar H, and are provided with scrapers I, to prevent earth from adhering to the peripheries of the wheels G G. The stay-rods J are perforated at the ends, and are connected to the bars C C by means of the forward ends of the angular bars E E, which pass through the perforations, and are held by the nuts above referred to, while the opposite ends of the stay-rods are adjustably connected to the beam A by a single bolt, which may be inserted in any one of a series of perforations, *a*. The advantage of this arrangement of the stay-rods is that by moving them toward the rear end of the beam and substituting a longer cross-bar for the bar B the bars C C may be arranged at a greater distance apart, and thus a wider knife or blade D may be used. The forward end of the beam A is provided with a bar, K, made vertically adjustable, as shown, and in the lower end of this bar is journaled a roller, L, to support the forward part of the beam. As this roller, as well as the rollers G G, is made adjustable vertically, the blade D may be set as deep in the ground as desired by the proper adjustment of said rollers.

The cultivator is designed to be drawn by a horse, and is provided with handles, by which it may be controlled.

Instead of a straight blade, one having a curved or a pointed edge may be used, if desired.

At the lower ends of the bars C C inclined guides *c c* are provided, to throw the earth inward from the drill-rows.

The advantage of the rotary rake is that it will rake the weeds out of the soil to the surface of the ground, where they will be exposed to the sun, and at the same time it will by its rotary movement clear itself of the weeds.

In some cases the rollers G may be dispensed with, allowing the teeth F to be supported directly on the ground.

Having thus described my invention, what I claim, and desire to secure by Letters Patent, is—

The combination of the beam supported by a roller at its forward end, the cross-bar secured to the beam near its rear end, the blade connected to the cross-bar by vertical bars, the angular bars connected together and carrying the rotary rake and a pair of rollers, and the stay-rods connected to the angular bars and to the bars carrying the blade, substantially as shown and described.

JOHN FEAST, SR.

Witnesses:
W. S. WILKINSON,
HARRY GILMOR.